(12) United States Patent
Canete Arratia

(10) Patent No.: US 9,487,057 B2
(45) Date of Patent: Nov. 8, 2016

(54) ANTI-SKID CHAIN COMPRISING A PLURALITY OF INTERCONNECTED MODULAR RUBBER LINKS

(71) Applicant: Universidad de Santiago de Chile, Santiago (CL)

(72) Inventor: Lucio Raul Canete Arratia, Santiago (CL)

(*) Notice: Subject to any disclaimer, the term of this patent is extended or adjusted under 35 U.S.C. 154(b) by 335 days.

(21) Appl. No.: 13/961,489

(22) Filed: Aug. 7, 2013

(65) Prior Publication Data
US 2013/0319590 A1    Dec. 5, 2013

Related U.S. Application Data

(63) Continuation of application No. PCT/IB2012/050494, filed on Feb. 2, 2012.

(30) Foreign Application Priority Data

Feb. 7, 2011  (CL) ..................................... 261-2011

(51) Int. Cl.
    *B60C 27/06*       (2006.01)
    *B60C 27/20*       (2006.01)
(52) U.S. Cl.
    CPC .............. *B60C 27/06* (2013.01); *B60C 27/20* (2013.01); *Y10T 29/49826* (2015.01)
(58) Field of Classification Search
    CPC ...... B60C 27/06; B60C 27/061; B60C 27/20
    USPC .......................... 152/185.1, 187, 232; 301/42
    See application file for complete search history.

(56) References Cited

U.S. PATENT DOCUMENTS

| | | | | |
|---|---|---|---|---|
| 1,099,454 A | * | 6/1914 | Kremer | .......................... 152/171 |
| 2,294,772 A | * | 9/1942 | Cook | .............................. 152/179 |
| 3,871,720 A | | 3/1975 | Mosshart et al. | |
| 4,848,430 A | | 7/1989 | Lenet | |
| 5,170,827 A | * | 12/1992 | Urleb et al. | .............. 152/225 C |

FOREIGN PATENT DOCUMENTS

| | | |
|---|---|---|
| EP | 0616910 A1 | 9/1994 |
| EP | 1614555 A1 | 1/2006 |
| EP | 1736330 A2 | 12/2006 |
| JP | 01024733 A  * | 1/1989 |
| WO | WO 03074301 A1 | 9/2003 |
| WO | WO 2012/107864 A3 | 8/2012 |

OTHER PUBLICATIONS

PCT "International Search Report and PCT Written Opinion of the International Search Authority" of Aug. 13, 2012 for International Application No. PCT/IB2012/050494 filed Feb. 2, 2012, WO 2012/107864 A3 published Aug. 16, 2012 of Universidad de Santiago de Chile.

* cited by examiner

*Primary Examiner* — Kip T Kotter
(74) *Attorney, Agent, or Firm* — Thomas W. Tolpin

(57) ABSTRACT

A chain to be used on vehicle wheels is provided to improve the tire grip in rugged ground and protect the tire against ground roughness. The chain is formed of special links. Each link has a U-shaped profile with a crossbar and lateral pillars. Top inner portion of each of the lateral pillars have a projection facing the central axis of the link which provides a male plug and defines a gap that provides a female cavity between the crossbar and the projection. A link at a position of 0° has a U-shaped flat profile. A link at a position of 180° has an inverted flat U-shaped profile.

17 Claims, 22 Drawing Sheets

ANTI-SKID CHAIN COMPRISING A PLURALITY OF INTERCONNECTED MODULAR RUBBER LINKS

TECHNICAL FIELD OF THE INVENTION

The present invention relates to a chain to be used preferably on wheels of motorized vehicles to improve its tire grip or traction in rugged ground of accidental geomorphology, both in urban and rural roads, thus protecting the tire against the ruggedness of the ground as well. The chain consists of modular rubber links with a tongue and groove fitting and fixing assembly. More specifically, the present invention relates to a modular chain made of rubber from a single continuous profile having a basic flat "U" shape, which, when cut crosswise into equally-spaced sections in length, allows to obtain a plurality of equal links, thus generating a series of unitary elements which, once they are assembled by alternating the concave shape position with the convex shape position, are bound together and form the chain. The tension as well as the friction between each link, allow to achieve the necessary strengthening and firmness to ensure the continuity of the chain which closes in a circular configuration.

BACKGROUND OF THE INVENTION

When land vehicles drive along a rough geomorphology ground they are likely to face two types of problems; One is related to the purpose of the displacement, which is hampered by sticking and/or slippage of the wheels in the ground. Another problem, refers to the deterioration of the vehicle itself which suffers aggression specially in its wheels, due to rock outcrops or other cutting and piercing elements in the ground. These problems are partially solved through the use of metal chains that are installed on the perimeter of the wheel or tire, when the vehicle encounters ground with snow and/or mud. These chains are sized to fit the rim size of the wheels, and adjusted by elastic clamping or hooks devices. The metal chains have the disadvantage that they are heavy, difficult to transport, and have fitting and adjustment means which are complicated, plus they must be acquired specifically for a determined rim size of the wheel of the vehicle in which they will be used. Another disadvantage of the metal chains is that they do not protect the tire or wheel against the microtopography of the ground, on which it is sometimes exposed to damage due to the sharpness of the clasts or rocks. A third disadvantage of metal chains is that they do not contribute as shock absorbers for the vehicle on which they are installed.

There have been several attempts to improve vehicle tire chains. For example, document CL 0355-1978 (Chile) (Hanff) published on Sep. 26, 1978, discloses a chain for vehicles driving on snow (commonly called snow chains), characterized in that they have a single clamping and fixing device, which replaces the independent locks of each tie. The system consists of two parts: two sliding crosspieces, each of which, on one hand, is attached to rings that are located at the end of outer crosspieces and on the other hand, after passing through the ring fixed in the same inner tie end, will be attached to the ring that is incorporated into the opposite tie end. A tensor is a piece of a chain which on one end is attached to one of the rings located on the outer tie end and the other side has a clip or hook, which, when it passes through the ring at the opposite end and pulled taunt, tightens the whole structure.

The document U.S. Pat. No. 4,848,430 (Leski) published on Jul. 18, 1989, discloses a snow belt or tread to be installed on a tire consisting of a rubber band mounted on the circumferential surface (tread) of the tire, that has a quantity of protrusions or lugs located on the outer surface of the tread of the tire, which are a convenient way to provide better grip or traction on the snow and having means for interconnection with linking devices to allow tying its ends together by means of a rope, to fasten a safety strap on both sides of the tire, and it accepts an insertion which is connected between the ends of the belt installed on the tire, which allows to lengthen the belt or rubber band, thus allowing its use on tires of larger sizes or diameters.

The document U.S. Pat. No. 3,871,720 (Crochett et al.) published on Mar. 18, 1975, discloses a traction tread, which is removable to be mounted on the tire tread portion. The tire tread comprises an inextensible rubber band or ring, which fits firmly around the perimeter of the tire and which is pressed against the tread of the tire inflated portion and a circumferential arrangement of alternating rigid plies and sheet rubber portions, which are placed on the outside of the tread band in order to improve the traction of the tire on soft and hard roads, respectively. The rubber portions have a slightly greater radial extension that make the plies to act radially spaced and absorb the impact on a hard road.

Application EP 1614555 (Rieger) published on Jan. 11, 2006, discloses a locking device for an anti-slipping chain with an elastic fastener for fixing it longitudinally and an automatic rear fixing of the network tread of the chain by applying a clamping force on the external holding device for the tread net section of the chain, characterized in that it comprises a fixing arch which is joined with the external fixing device of said chain, which has guiding eyelets to guide a fastener element, which comprises on both ends joining elements for two sections of the fixing length of the external fixation device.

Application WO 03/074301 (Aegyd) published on Sep. 12, 2003, discloses a anti-slip chain which comprises a continuous mesh chain and a clamping device attached to it, which is closed when mounted on the inner side wall of a tire, a locking device being arranged on both ends of the fixing device, respectively, which allows that both locking devices to be joined together applying tension to the mesh chain on the outside of the tire tread by at least one tensioning/clamping device, the two end pieces respectively, present a base in a plate form and can be essentially moved along a parallel plane to both base plates to a locked position in which both intermesh in a removable way, presenting the base of the first of the two end pieces a fixing projection, characterized in that a provision has been made of ridges opposed to each other and distant from the base of the second locking piece to take the base of the first locking piece to the closed position in which in said closed position, one of the ridges is made at least of segments of said fixing projection, as it supports itself on a back-side of the of the first locking device which is opposed to the fixing projection on the other ridge, while it holds the locking pieces mounted on the locked position by means of the traction forces introduced through the continuous chain mesh, which is held in position by both locking pieces.

None of the documents described above, which represent various inventive concepts, mentions a chain to be used on wheels of land vehicles, made of modular links made of rubber with a matching assembly, which is lightweight, portable, with adjustment means and of easy installation, which can also be used on different sizes of wheel rims of vehicles, both motorized, of human or animal traction.

BRIEF SUMMARY OF THE INVENTION

The present invention relates to a modular rubber chain, manufactured from a single rubber profile that has a basic form of a flat "U", where the profile when evenly cut in its length, produces a quantity of identical links, which intertwine alternately in a concave and convex position, forming the rubber chain. Lateral forces generated by positioning the chain on the tire tread or wheel make the rubber links stretch and bend the opposite way, generating a first concave curvature which is coincident with the convex curvature of the tire, and a second concave curvature, towards the outside of the tire. The first concave curvature helps to improve the adherence to the ground and the grip of the chain to the tire and the second concave curvature helps to increase the grip and adherence of the wheel to the ground.

BRIEF DESCRIPTION OF THE DRAWINGS

The enclosed drawings are included to provide a better understanding of the invention, and are part of this description and further illustrate some of the prior art and some of the preferred embodiments, in order to explain the principles of the present invention.

DESCRIPTION OF THE INVENTION

The present invention refers to a modular rubber chain, which is manufactured from a single rubber profile that has a basic shape of a flat "U", where the profile when evenly cut length wise, produces a quantity of links and generates a first type of link in a flat "U" shape and a second link type of an inverted flat "U", which in turn are meant to intertwine matching together, this helps to build the chain. The links have a flat "U"-shaped profile which matching means are located on the upper ends of their vertical pillars, and have the shape of two projections directed towards the inside of the "U", which when juxtaposed with links shaped as an inverted flat "U" profile, have the same matching projections which generate a locking means between each link. Lateral forces generated by installing the chain on the tread of the tire, make rubber links to stretch and bend the opposite way, generating a first concave curvature that matches the convex curvature of the tire, and a second concave curvature which projects towards the outside of the tire, which helps to obtain a firm and secure grip on the tread of the wheel.

Figure 1:
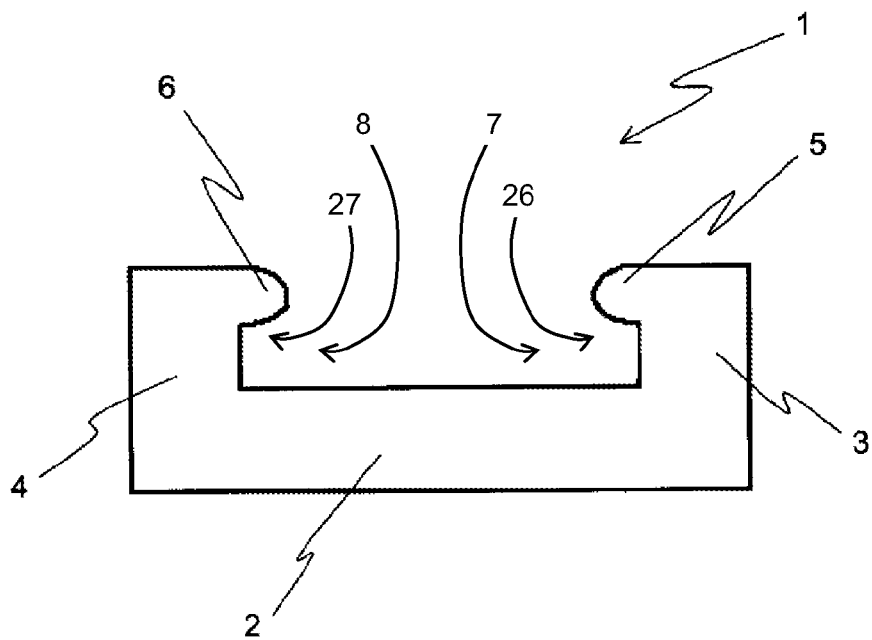
FIG. 1 shows a front elevation cross section of a link of the chain for vehicle wheels, when the link is loose and not joined with its neighboring links.
Figure 4:
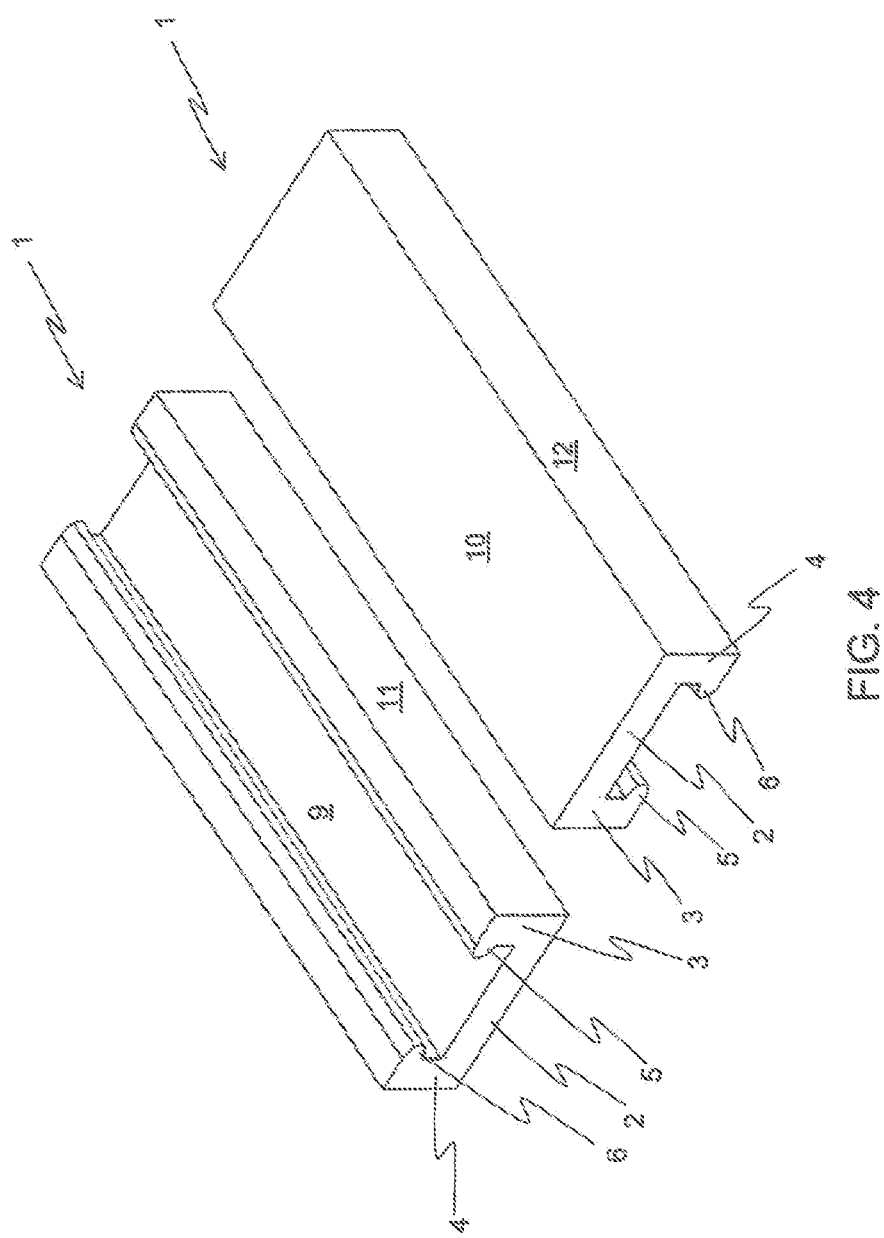
FIG. 4 shows a perspective view of two links of the chain for vehicle wheels, arranged next to each other, without stress, i.e. they are not part of the chain, when the chain has been adjusted to the chain.

Referring to the drawings, FIG. 1 shows the front face of one of the links that form part of the chain for the wheels of motor vehicle of the present invention. The link (1) has a profile with a basic shape of a flat "U", which has a crossbar (2), a first lateral pillar (3) and a second lateral pillar (4). On the top inner portion (26), the first lateral pillar (3) has a first upper inner portion with a first projection (5) which faces the central axis of the link (1), as a male extension plug, creating between the crossbar (2) and the first projection (5) a first gap (7) in the form of a female cavity. The second lateral pillar (4) has a second upper inner portion with a second projection (6) also oriented toward the central axis of the link (1), in the form of a male extension plug, creating between the crossbar (2) and the second projection (6) one second gap (8) in the form of a female cavity. As shown in FIG. 4, the link (1) has an upper face (9), a lower face (10), a first side face (11) and a second side face (12). In this case, the first and second projections (5, 6) terminate in a convex curved edge to facilitate the assembling of the first and second gaps (7, 8) of a rectangular shape.

Figure 2:
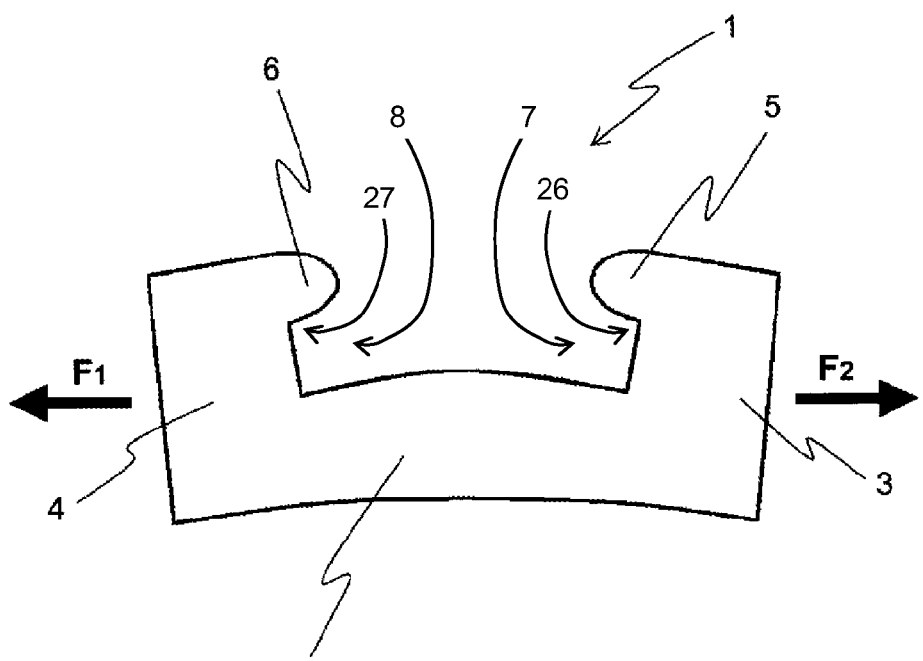
FIG. 2 shows a front elevation view of the cross section of a link of the chain for vehicle wheels, when it is assembled and joined with its neighboring links, bending due to lateral forces generated when the chain is positioned on the tread of the wheel.

As shown in FIG. 2, by applying lateral forces (F1, F2) the link (1) curves, bending the first and second side pillars (3, 4) outwards with respect to the central axis of the link (1) as a result of the curvature of the beam (2), which curves in a concave curved way towards the outer part of the link (1) and curves in a convex curved way towards the inner part of the link (1) right between the first and second side pillars (3, 4). The inclination of the first and second side pillars (3, 4), will also tilt the first and second projections (5, 6) and of the first and second gaps (7, 8).

Figure 3:
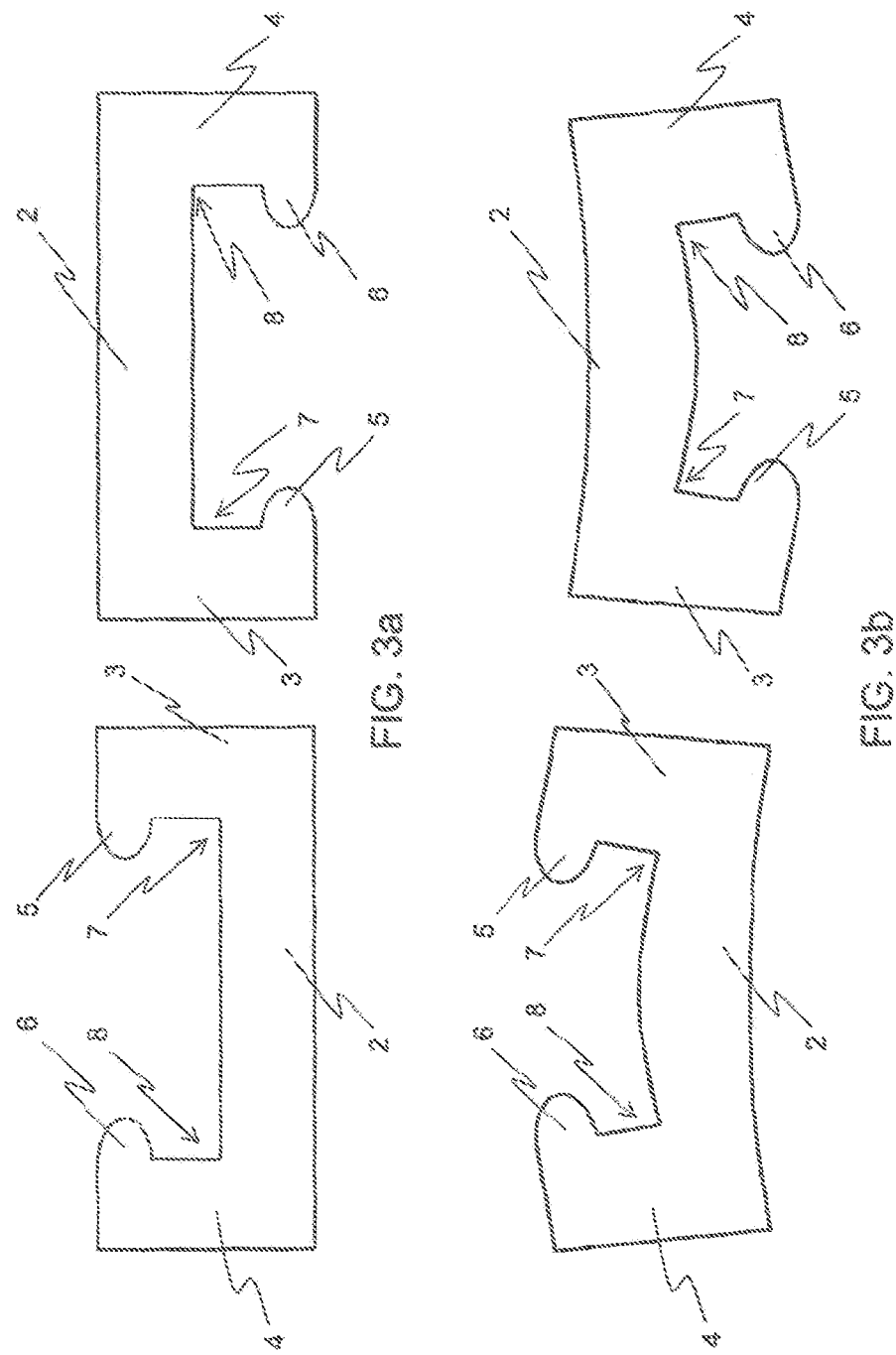
FIG. 3a, shows a front elevation view of a pair of links of the chain for vehicle wheels, without being subject to lateral forces.
FIG. 3b, shows a front elevation view of two links of the chain for vehicle wheels, shown in FIG. 3a, upon which links, lateral forces generated by adjusting the chain on the wheel tread or perimeter, have been applied.

The modular rubber chain is formed by a plurality of links (1) taking two positions. A first link in position at 0° whose profile is shaped like a flat "U" and a link in position at 180° whose profile has a shape of an inverted flat "U". FIGS. 3a and 3b are shown in pairs, of rubber links not assembled, a first pair of links without the application of lateral forces, and a second pair, with the application of lateral forces, which, as explained below, the forces are generated when links (1) which form the chain (13) are mounted around the wheel (14).

Figure 5:
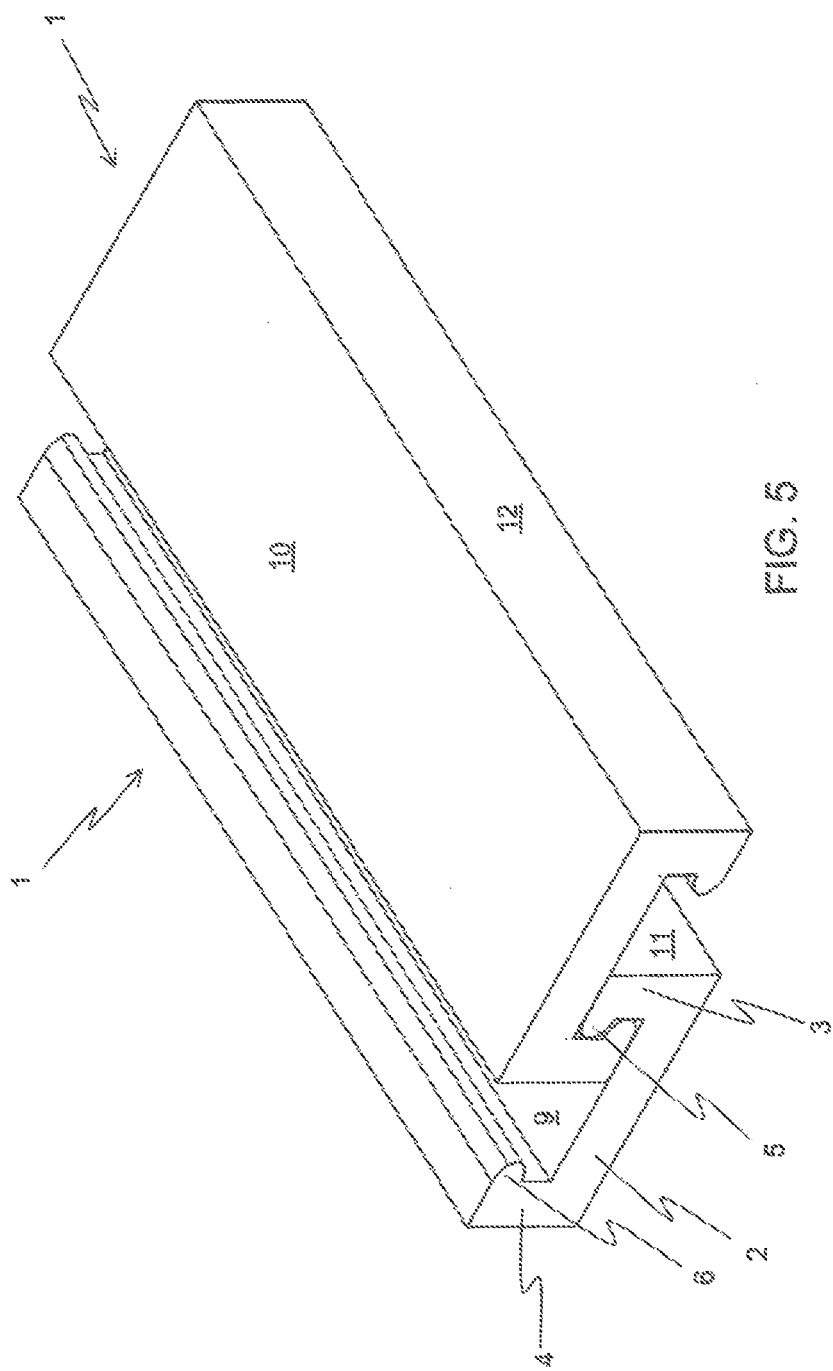
FIG. 5 shows a perspective view of two links of the chain for vehicle wheels, placed one next to the other without being subject to tension.

For the assembly of the chain (13), a first link is placed in a position at 0°, taking the form of a flat "U". A second link is positioned at 180 degrees having the shape of an inverted flat "U", where the first lateral pillar (3) of this link that is in position of 180°, is then inserted between the first and second side pillars (3,4) of the link positioned at 0°. The first projection (5) the link in position 180°, is introduced into the first gap (7) of the link positioned at 0°, leaving both links locked in a matched position, as illustrated in FIG. 5.

Figure 6:
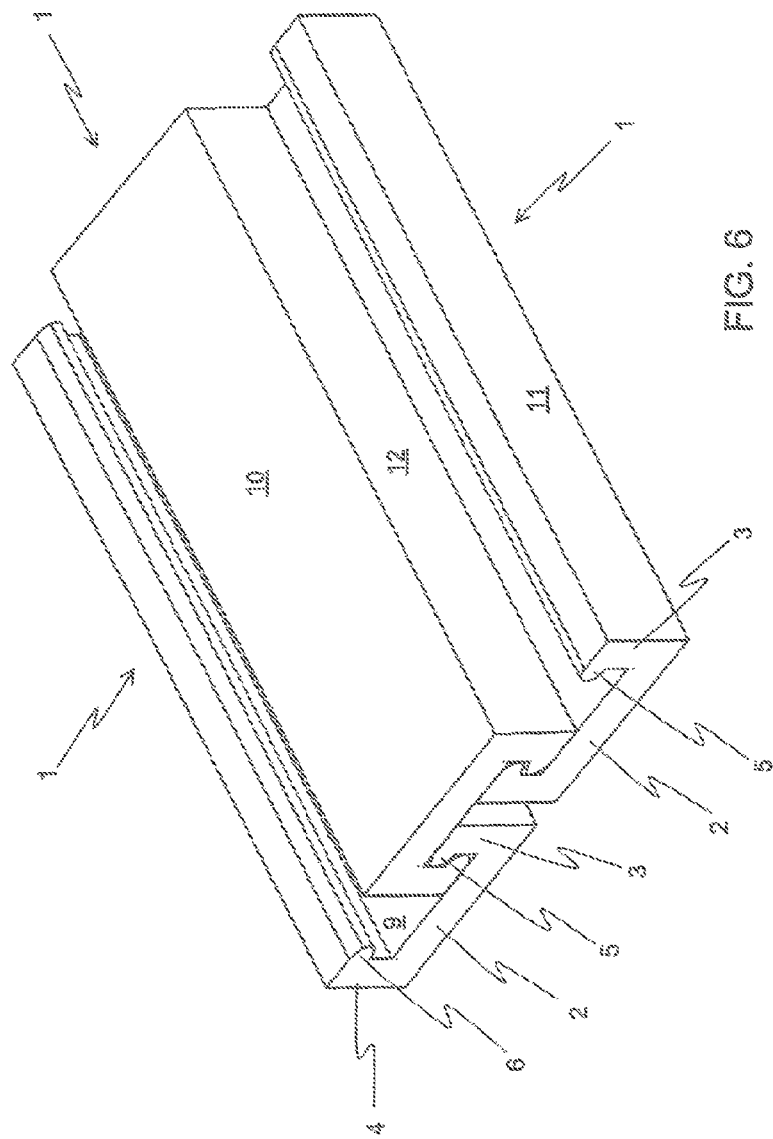
FIG. 6 shows a perspective view of three links in the chain for vehicle wheels, mounted side by side without being subject to stress, i.e. without being part of the chain when it is set on the chain.

The same operation is repeated on the opposite side of the link placed in a position at 180°, as shown in FIG. 6. A third link is placed in a position at 0°, taking the form of a flat "U", where the second lateral pillar (4) of this link, is in position 0° and is inserted in between the first and second side pillars (3, 4) of the link positioned at 180 degrees. The second projection (6) of the link in position 0° is inserted into the second gap (8) of the link positioned at 180 degrees, leaving the last two links also locked in a matched in position.

Figure 7:
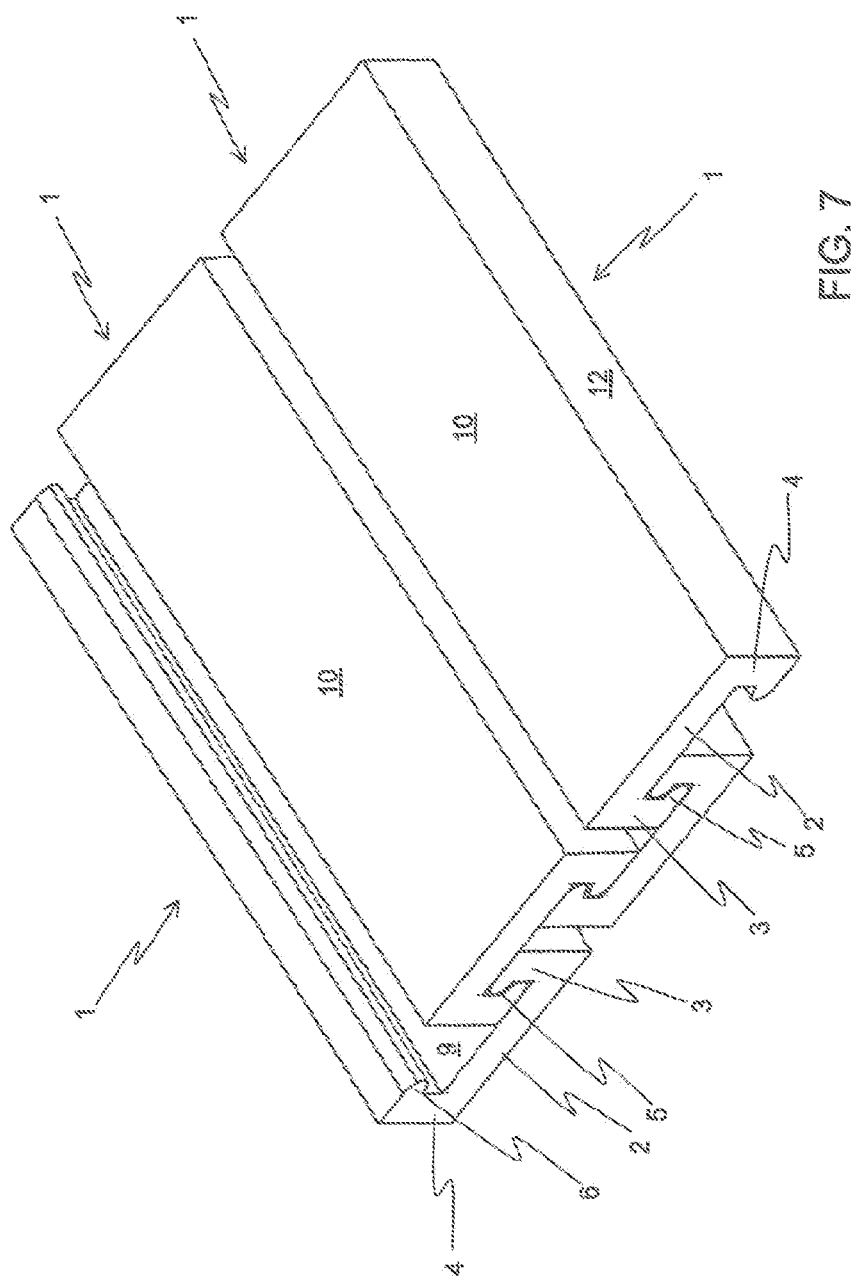
FIG. 7 shows a perspective view of four links of the chain for vehicle wheels, mounted alternatively one on the side of the other without being subject to stress.
Figure 8:
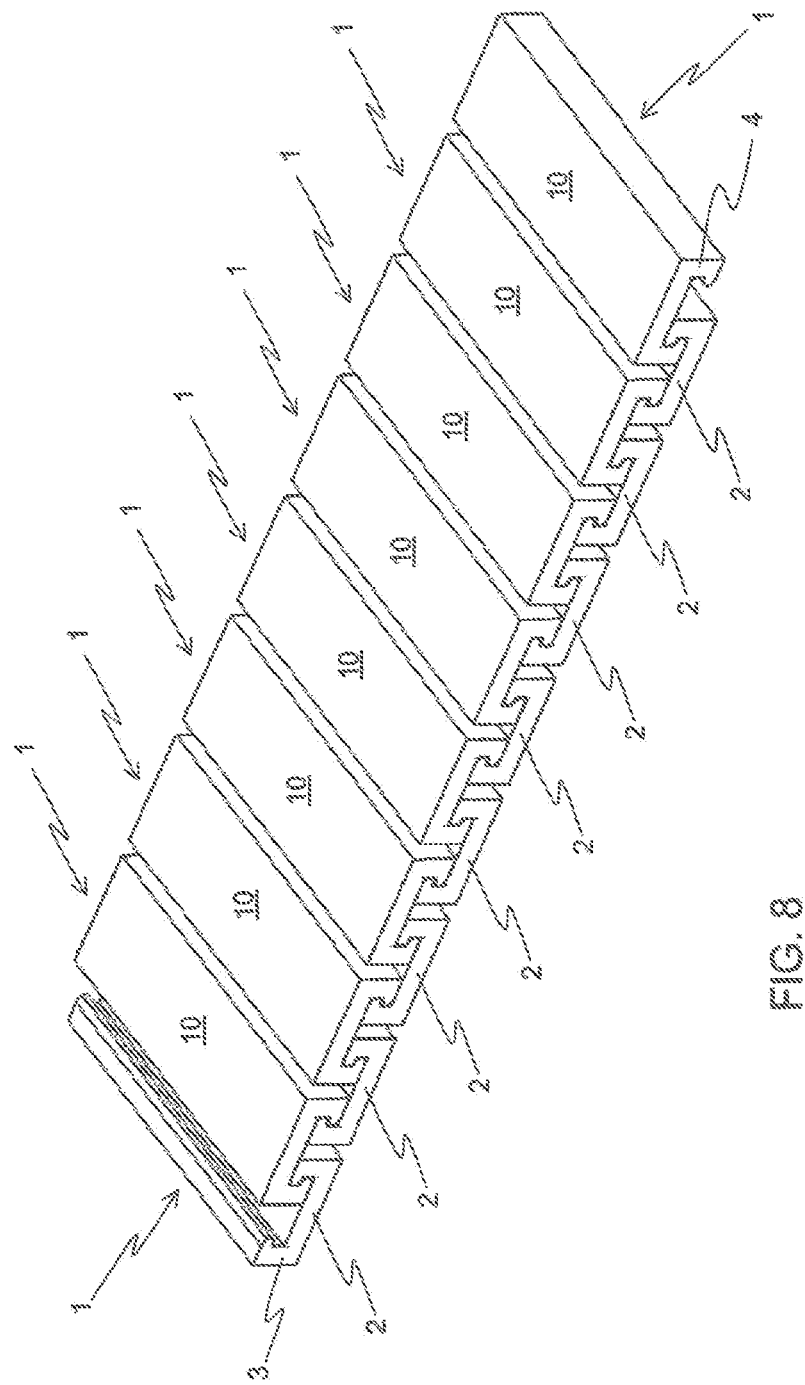
FIG. 8 shows a perspective view of a plurality of links in the chain for vehicle wheels, alternatively mounted one on the side of the other without being subject to stress.
Figure 9:
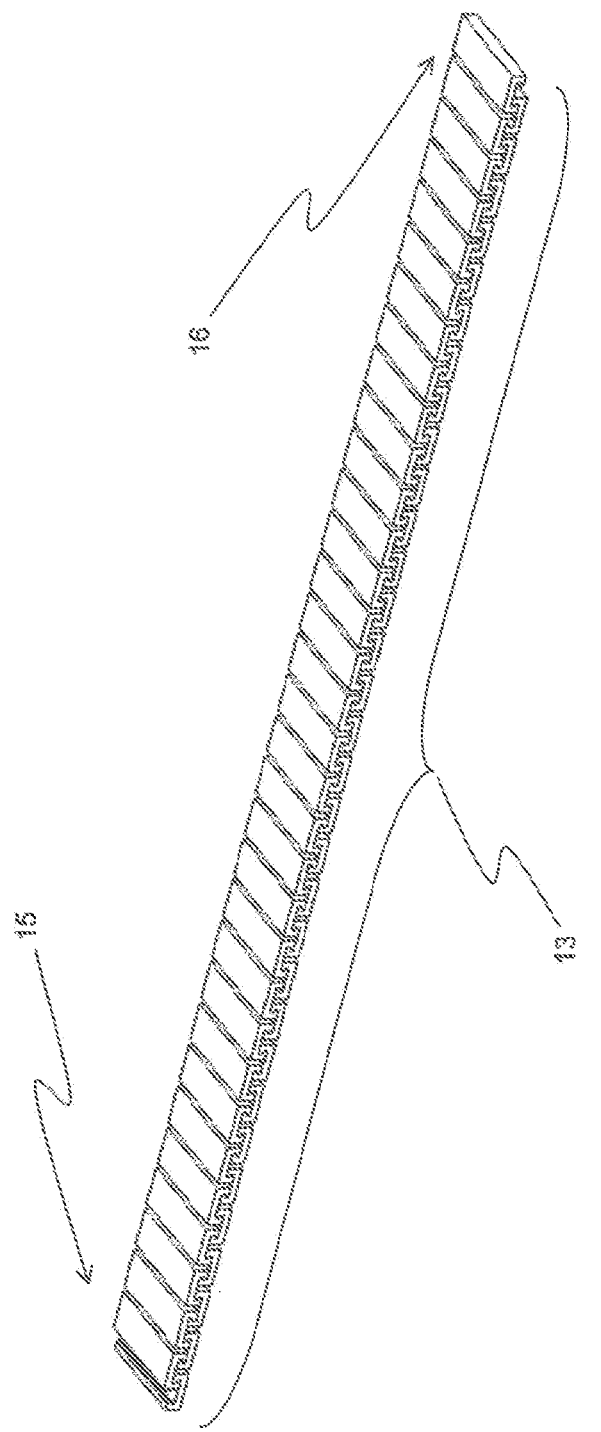
FIG. 9 shows a perspective view of a plurality of links of a chain for vehicle wheels, alternatively mounted side by side, where the location of the links has almost reached the complete perimeter of the wheel.

As shown in FIGS. 7 to 9, the operation is repeated several times and links are added until obtaining the desired length of the chain (13) to cover the complete contour of the tread of the wheel (14).

Figure 10:
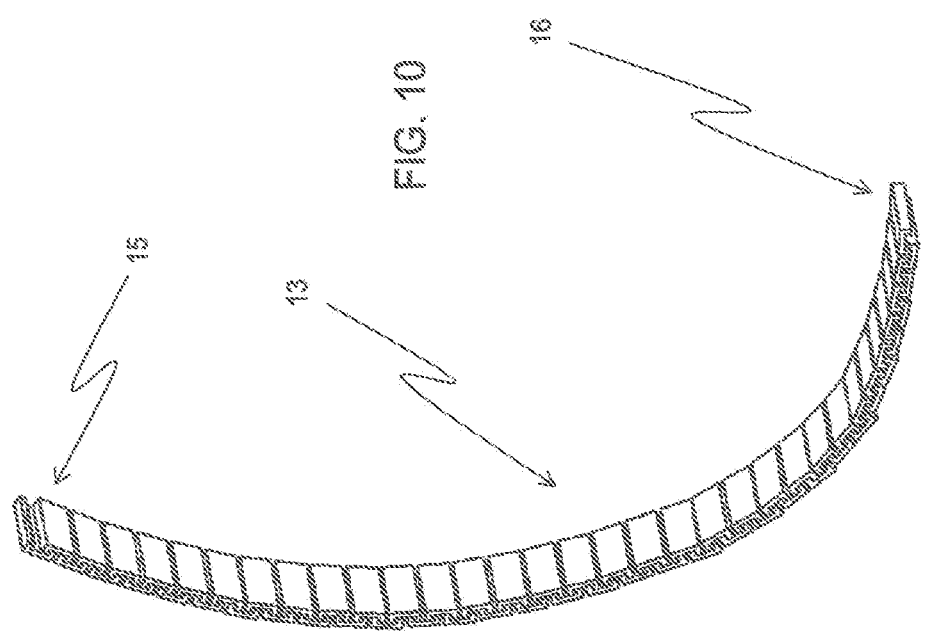
FIG. 10 shows a perspective view of a plurality of links of the chain for vehicle wheels, alternatively mounted side by side, where the placement of the links has almost reached the perimeter of the wheel and the assembly can be curved and subsequently tensioned and thus attaining the outer perimeter of the tire of the wheel.
Figure 11:
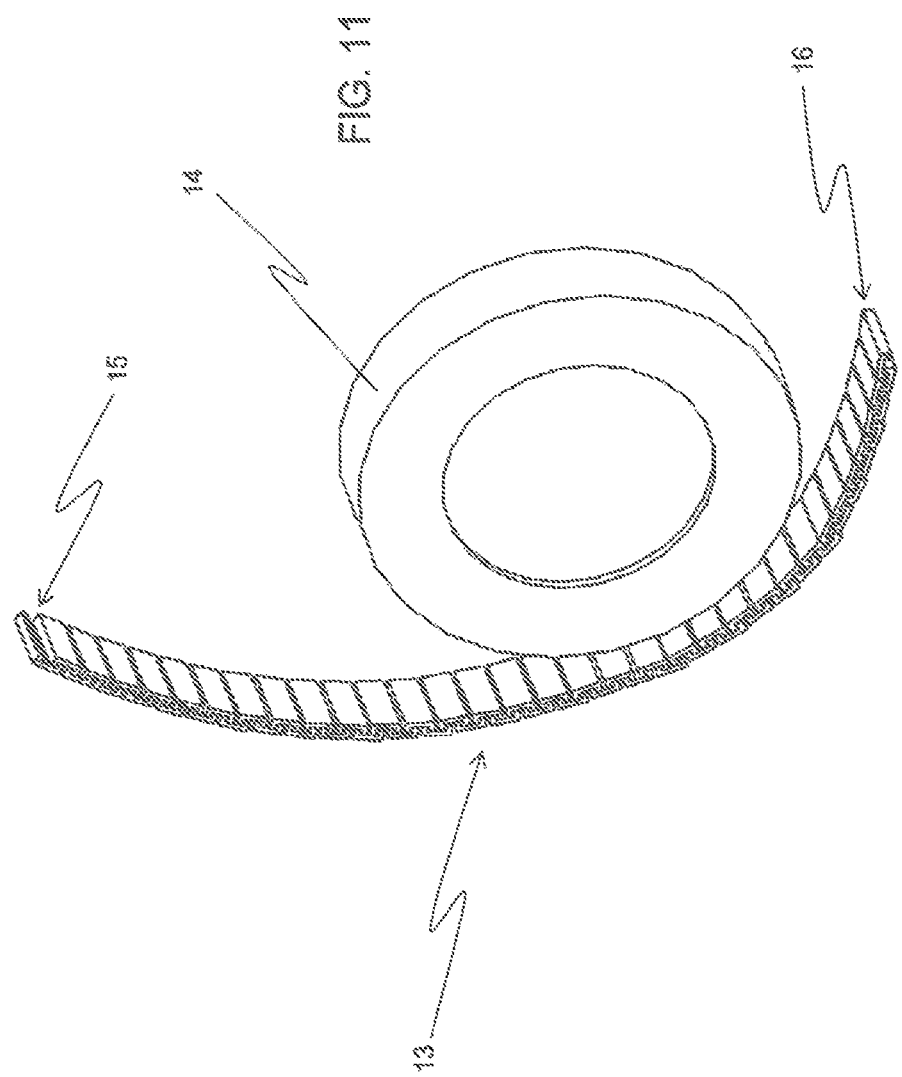
FIG. 11 shows a perspective view of a plurality of links of the chain for vehicle wheels, alternatively mounted one on the side of the other, where the placement of the links has almost reached the perimeter of the wheel and it is possible to curve the assembly and then subject it to tension, thus covering the outer perimeter of the tire tread on the wheel, showing the wheel as a curvature reference.
Figure 12:
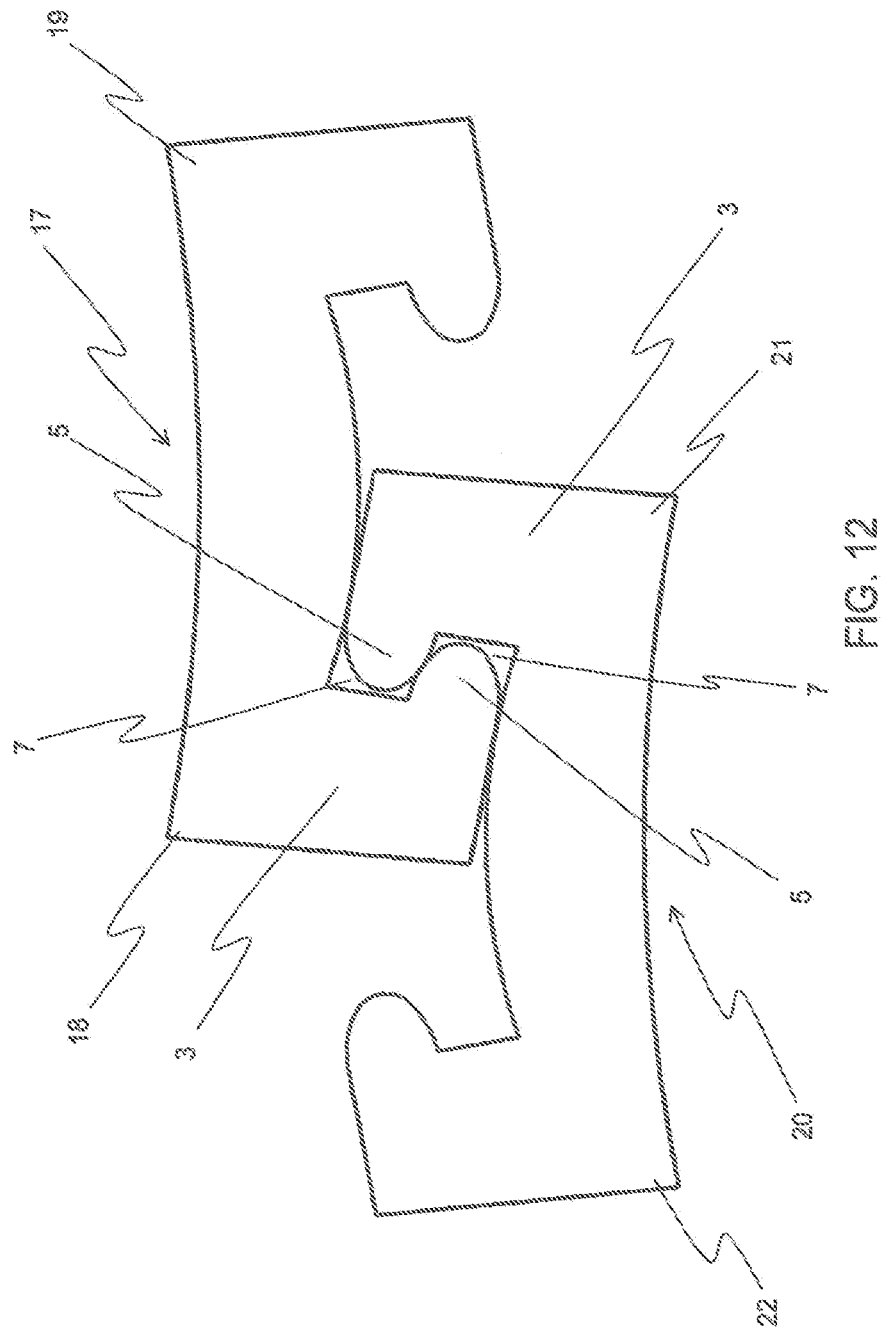
FIG. 12 shows an enlarged view in front elevation, of a pair of links of the chain for vehicle wheels, to which lateral forces have been applied, showing the types of curvature generated from one link to another, where these forces are a result of stretching the chain so that it lengthens its length and firmly sets on the tread or perimeter of the wheel.
Figure 13:
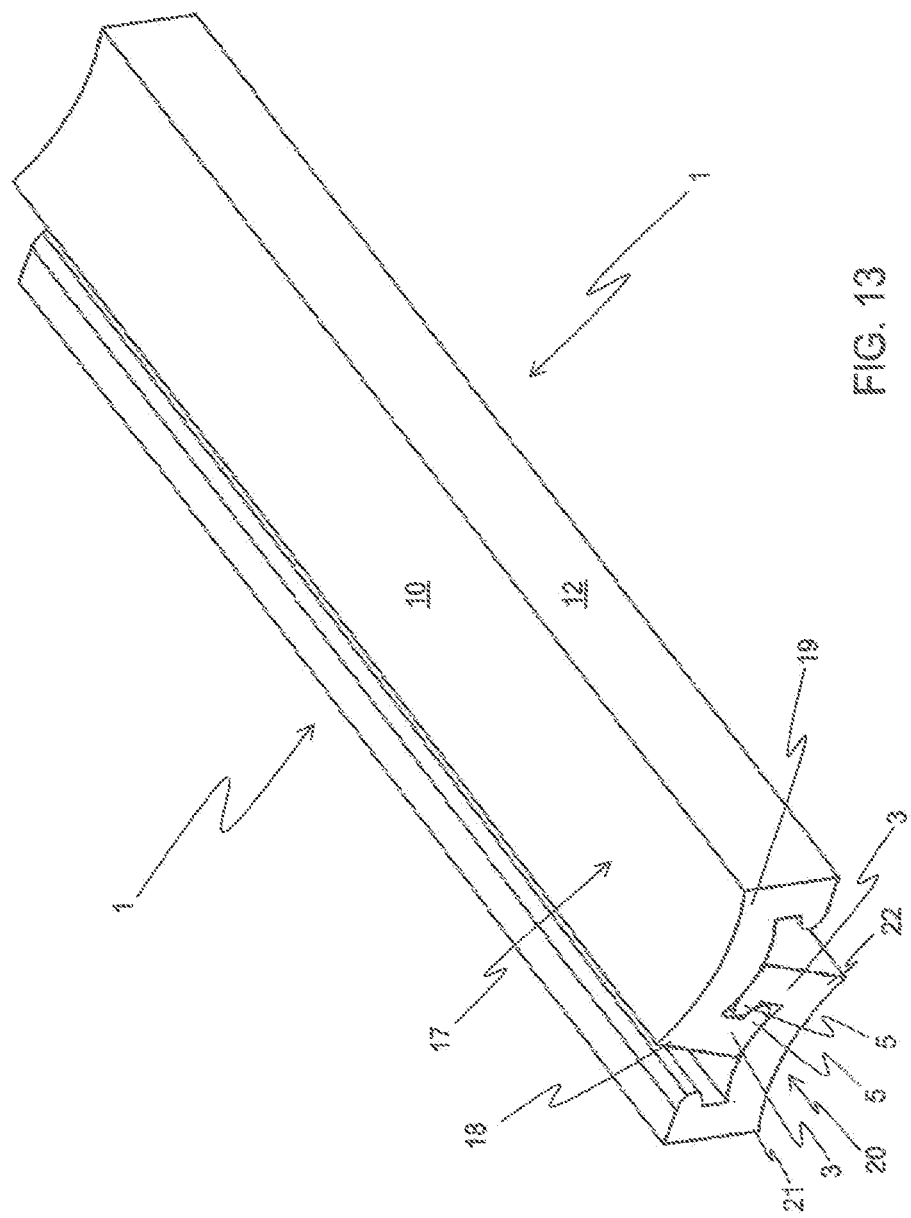
FIG. 13, shows a perspective view of a pair of links of the chain for vehicle wheels, to which lateral forces have been applied, showing the types of curvature generated between one link to the other.
Figure 14:
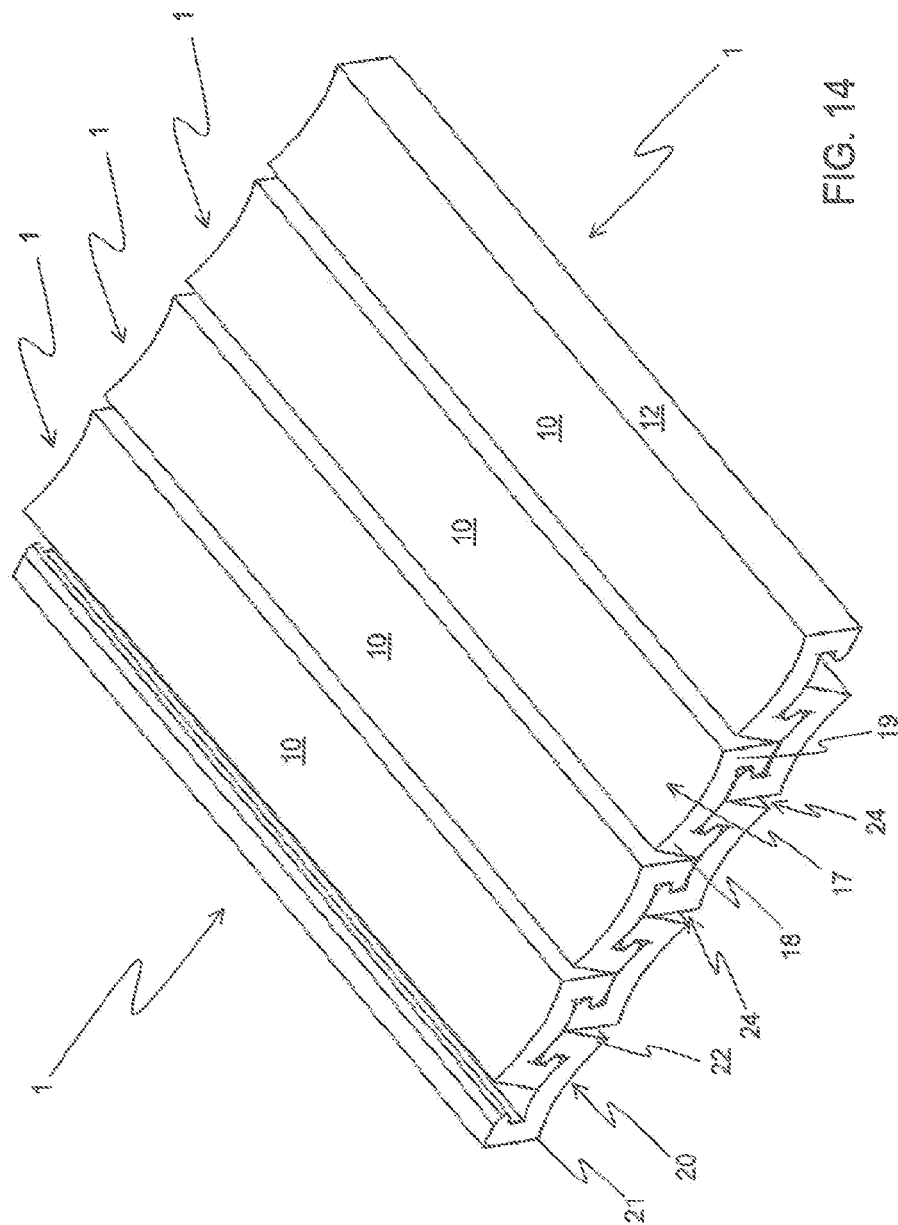
FIG. 14, shows a perspective view of a plurality of links of the chain for vehicle wheels, to which lateral forces have been applied, showing the types of curvature generated between one link to another.
Figure 15:
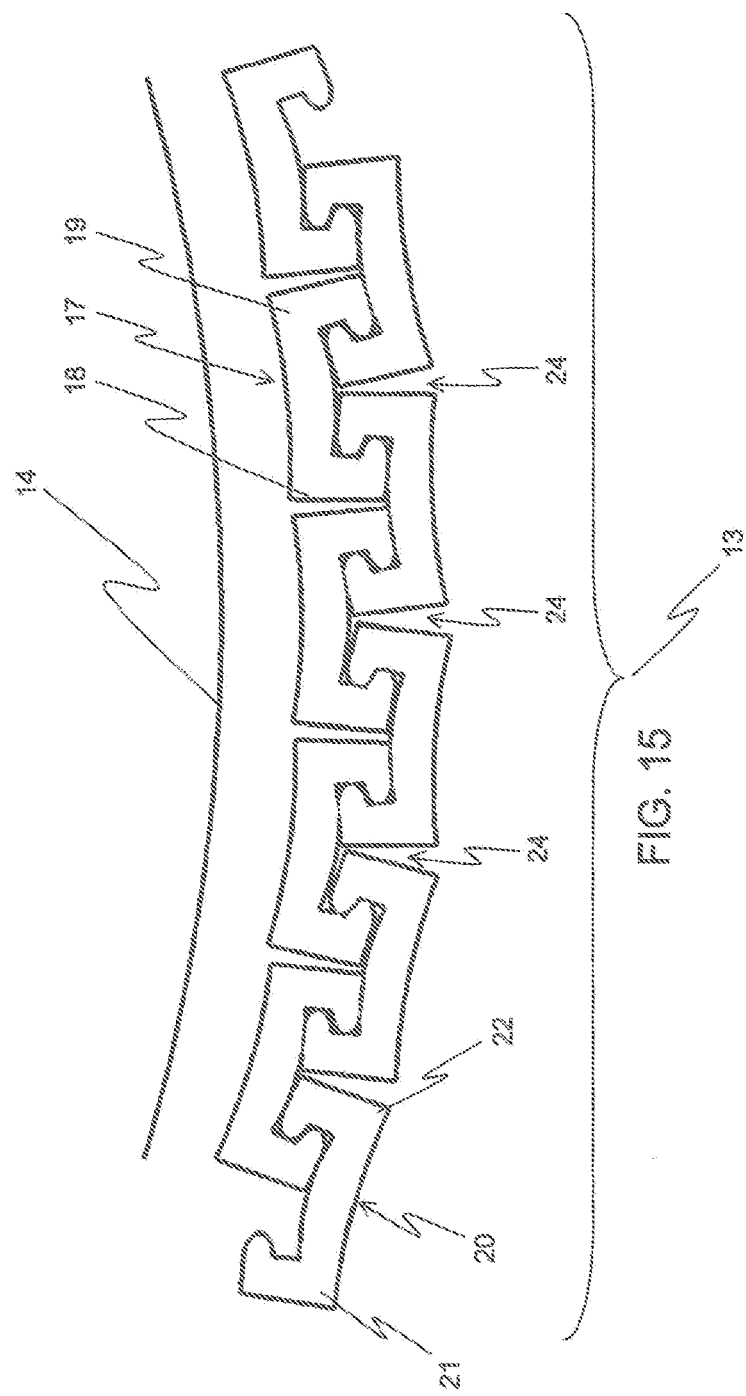
FIG. 15 shows a front elevation view of a plurality of links of the chain for vehicle wheels, to which lateral forces have been applied to adjust the chain to the wheel tread of the tire, showing the types of curvatures generated from one link to another, and where part of a tire profile on which the chain will be installed, is shown.

Once the latter has been achieved, and the chain (13) has been assembled on the ground and in front of the wheel (14), the vehicle is driven to a stop on top of the chain (13), leaving the ends (15, 16) of the chain (13) free, so they can be wrapped around the wheel (14), so that the links from the ends (15, 16) can be assembled and linked via the matching system, as shown in FIGS. 10 and 11.

The procedure described above, allows links (1) to curve according to what is shown in FIGS. 12 to 15. The links that are positioned at 180 degrees into the shape of an inverted flattened "U", generate a concave curve curvature (17) on the surface of the underside face (10), which finishes at a first end (18) and in a second end (19), the curvature being concave curve (17) which matches the convex curved surface of the wheel (14). The links that are positioned at 0°, taking the form of a flattened "U", generate a concave curve curvature (20) on the surface of the underside (10) of link (1), which terminates at a first end (21) and at a second end (22). The ends (21, 22) can generate ground-oriented points to help the chain to insert itself into the mud or snow, improving the adherence to the ground. In addition to the emergence of the ends (21, 22) which contribute to the tire grip with respect to the ground, a space (24) is generated between the outer links (1) parallel to the rotation axis of the wheel (14) which as a superficial feature in the chain (13) improves the adherence to the ground (23).

The chain is firmly fitted to the wheel tread perimeter, due to the friction of rubber against its surface.

Figure 16:
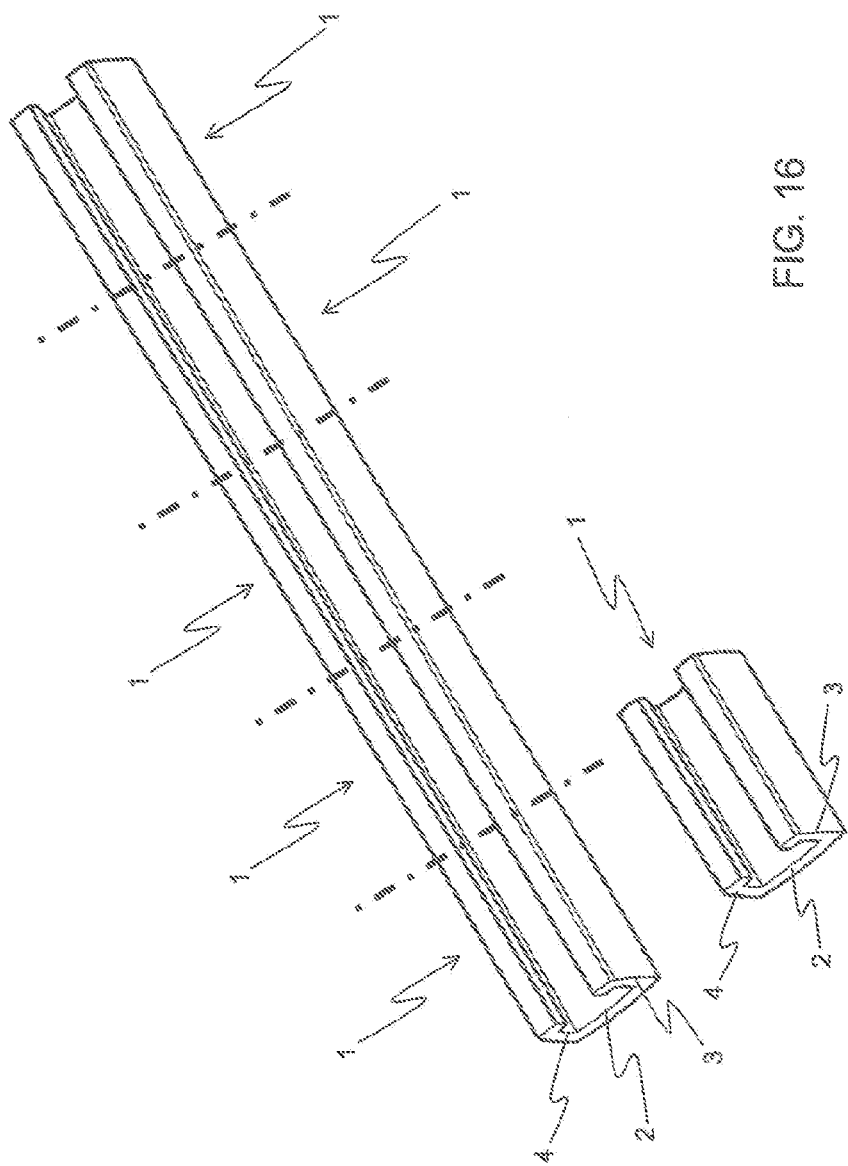
FIG. 16 shows a perspective view of the rubber profile used to manufacture the chain of the present invention, which is cut to a desired length with the offset, in order to obtain the links.

The modular rubber chain links are obtained from a single rubber profile that has the basic shape of a flat "U", which is cut according to a desired width, as shown in FIG. 16. This figure shows an elongated rubber piece or profile which is cut into a plurality of links (1) according to a desired width, which is given by the width of the wheel of the vehicle that will use the chain.

Figure 17:
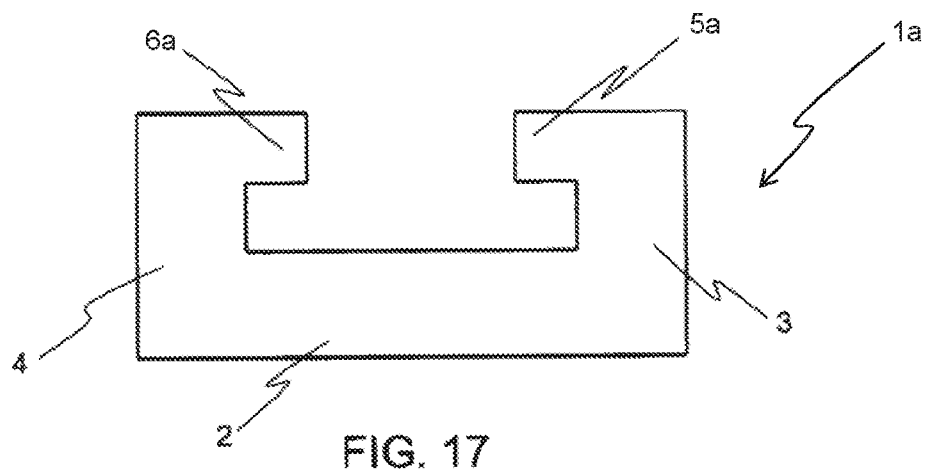
FIG. 17 shows a front elevation view of a second embodiment of the cross section of a link of the chain for vehicle wheels.
Figure 18:
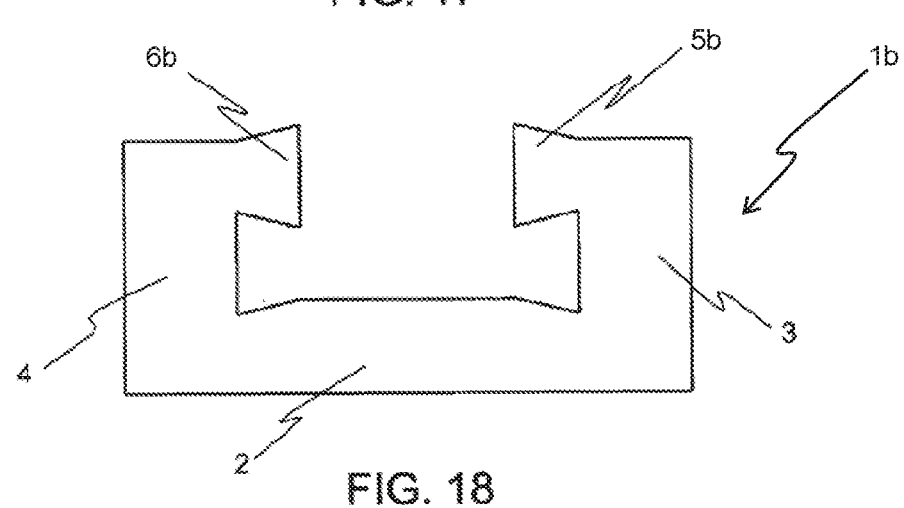
FIG. 18 shows a front elevation view of a third embodiment of the cross section of a link of the chain for vehicle wheels.
Figure 19:
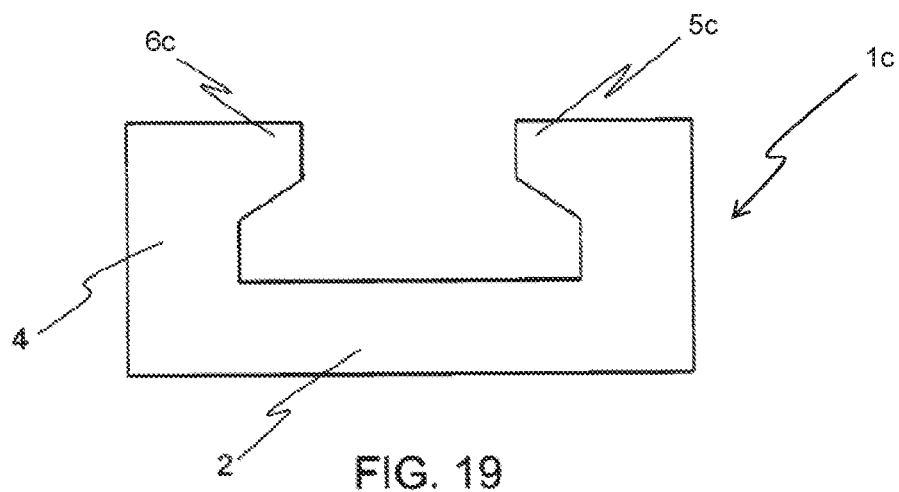
FIG. 19 shows a front elevation view of a fourth embodiment of the cross section of a link of the chain for vehicle wheels.

FIGS. 17 to 19 show various shapes of profiles that can form the chain of the present invention. These shapes can vary according to the chosen types of matching devices. In the case of FIG. 17, a second embodiment of link (1a), the first and second projections (5a, 6a) are formed by a projection of a rectangular cross section and the first and second gaps (7a, 8a) have the shape of a rectangular cavity. In FIG. 18, a third embodiment of link (1b), the first and second projections (5b, 6b) are formed by a dovetail-shaped projection and the first and second gaps (7b, 8b) have the form of a cavity homologous to the dovetail shape of the first and second projections (5b, 6b), allowing a perfectly adjusted fit. As shown in FIG. 19, a fourth embodiment of link (1c), the first and second projections (5c, 6c) are formed by a trapezoidal cross-section projection and the first and second gaps (7c, 8c) have the form of a matching trapezoidal cavity.

Figure 20:
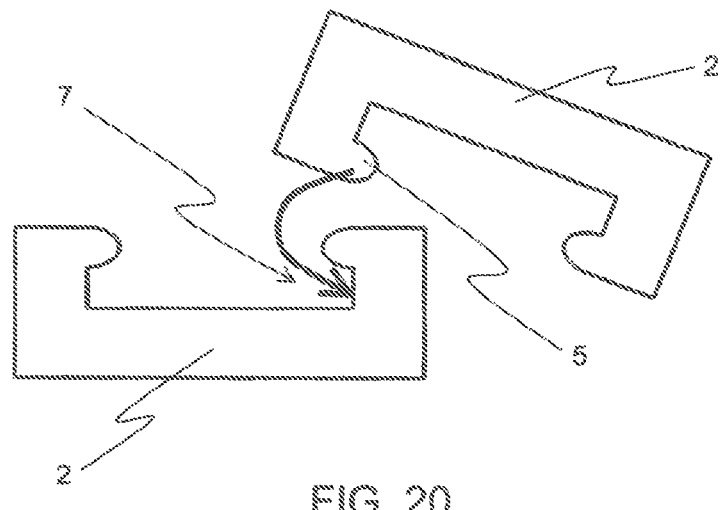
FIG. 20 shows a front elevation view of a first form of assembly of two links of the chain for vehicle wheels.
Figure 21:
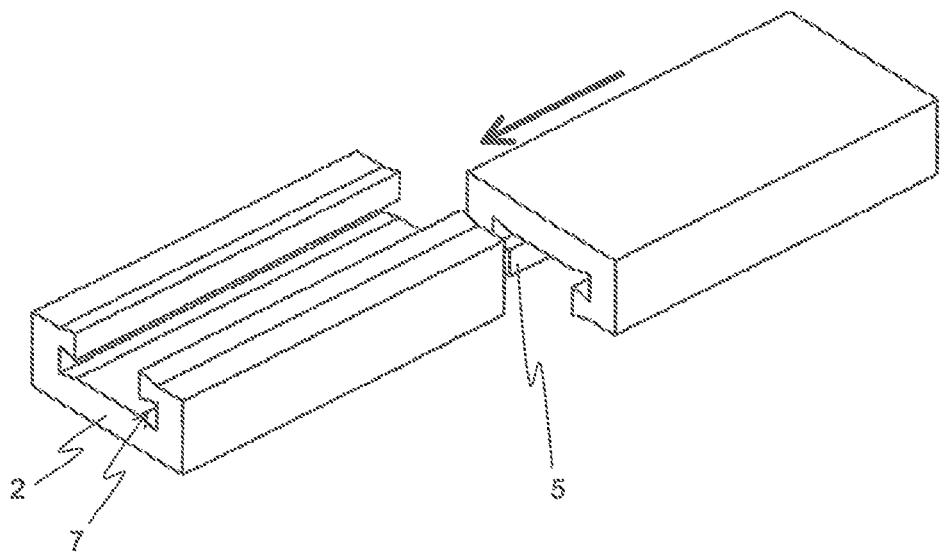
FIG. 21 shows a perspective view of a second form of assembly of two links of the chain for vehicle wheels.

Depending on the chosen matching device (tongue and groove fit), the assembly of the links will be one on top of the other, so that one of the male projections (5, 6), passes between the first and second side pillars (3, 4) towards the corresponding female cavity (7, 8), as shown in FIG. 20. If the type of tongue and groove matching fit is tight, it is best recommended to do a skid mounting of the chain, as shown in FIG. 21.

Figure 22:
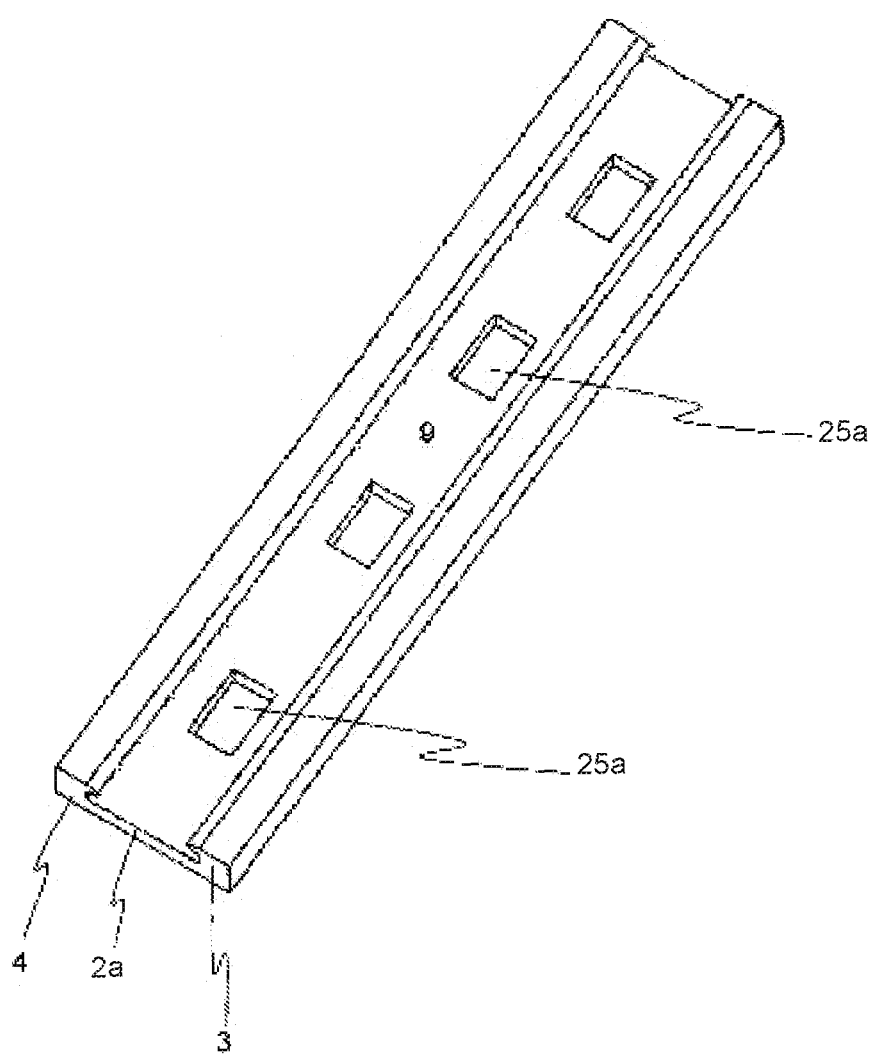
FIG. 22, shows a perspective view of a link of a chain for vehicle wheels, which has a first embodiment of fretworks to lighten the weight and improve the tire grip.
Figure 23:
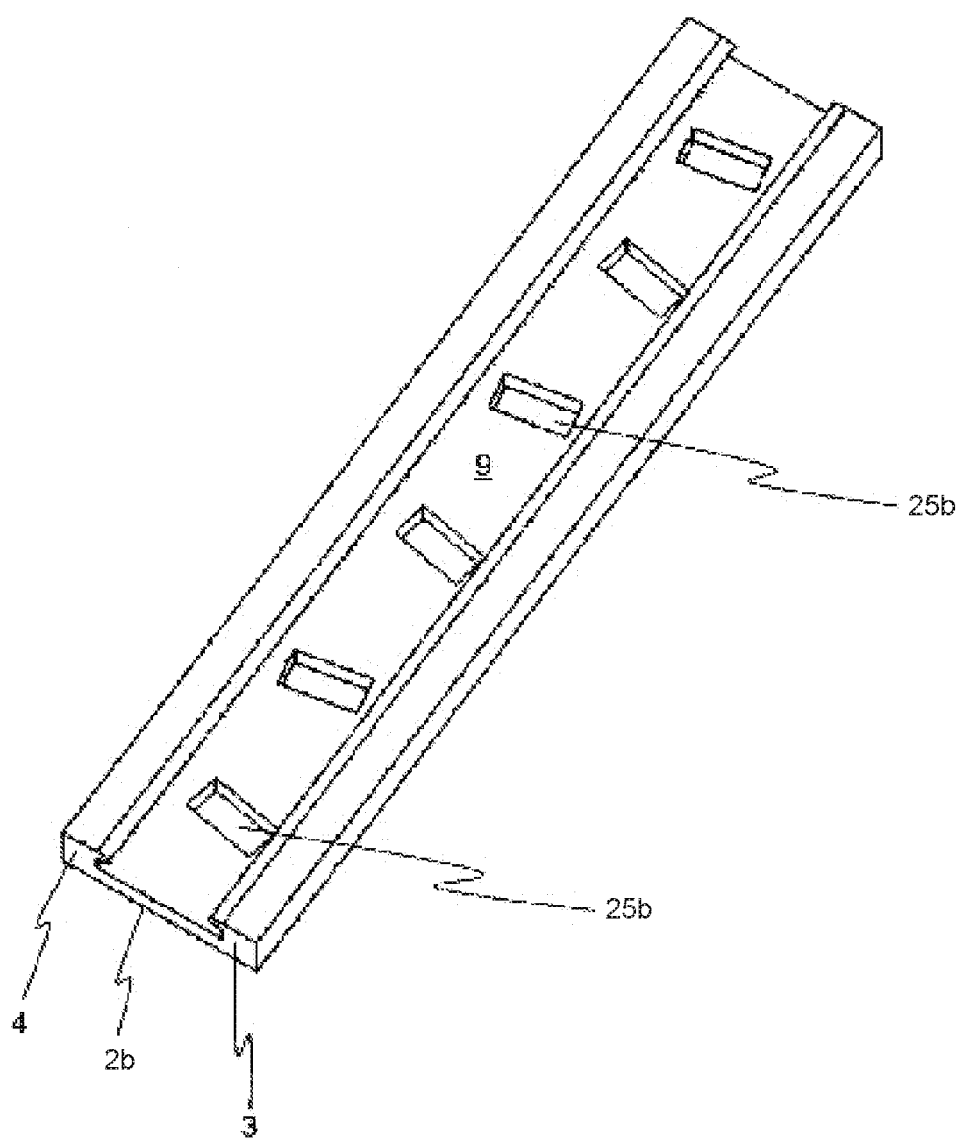
FIG. 23, shows a perspective view of a link of a chain for vehicle wheels which has a second embodiment of fretworks to lighten the weight and improve the tire grip.
Figure 24:
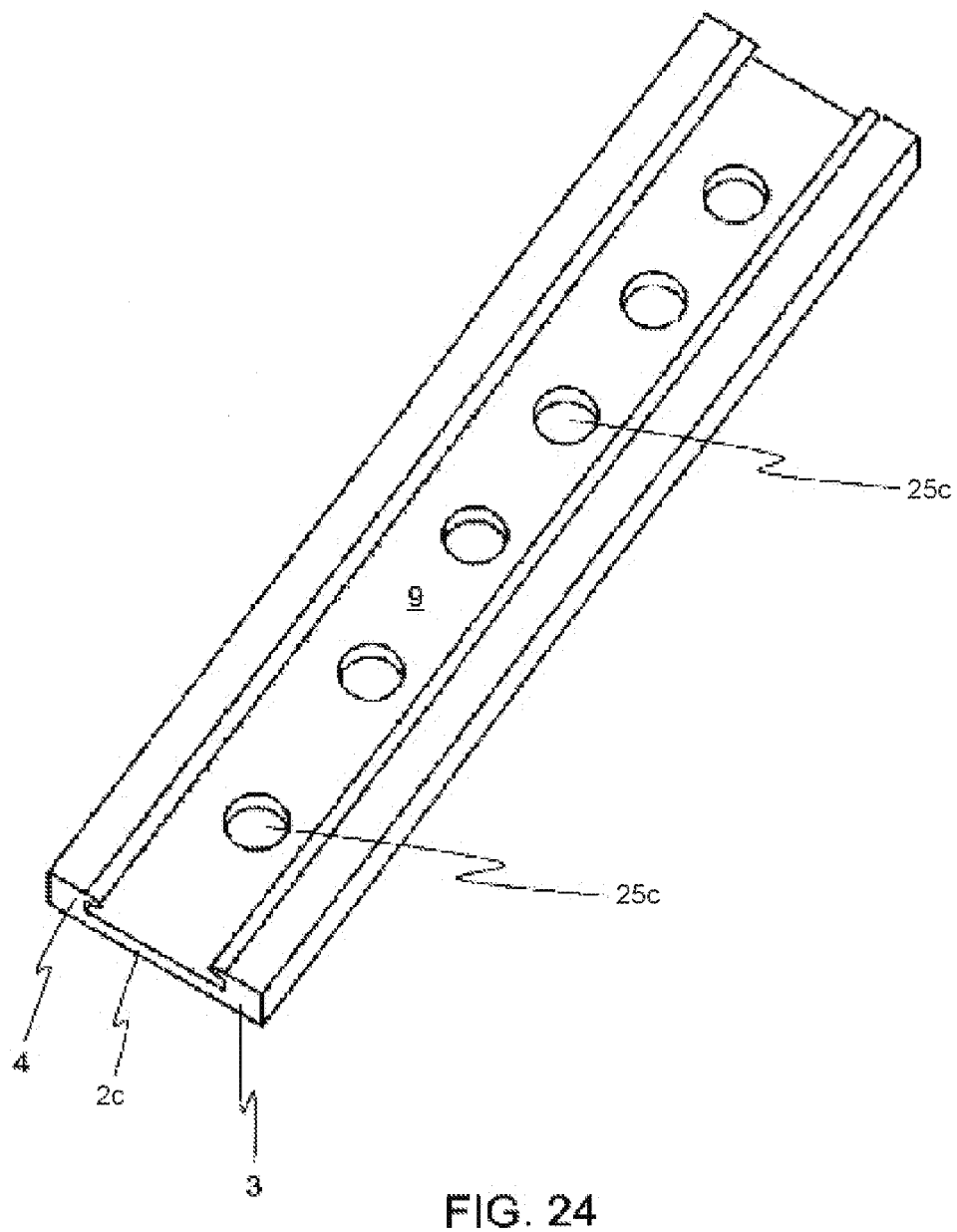
FIG. 24 shows a perspective view of a link of a chain for vehicle wheels which has a third embodiment of fretworks to lighten the weight and improve the tire grip.

In order to make the chain (13) lighter and to improve the tire grip with respect to the ground (23), an embodiment of manufacturing the links (1) consists of making a plurality of fretworks (25) between the upper face (9) and the lower face (10) as shown in FIGS. 22, 23 and 24, which cross sections present diverse geometries as crossbars (2a) (FIG. 22) with rectangles (25a), crossbars (2c) (FIG. 24) with circles (25c), and crossbars (2b) (FIG. 23) with oblique rectangles (25b), among others.

Figure 25:
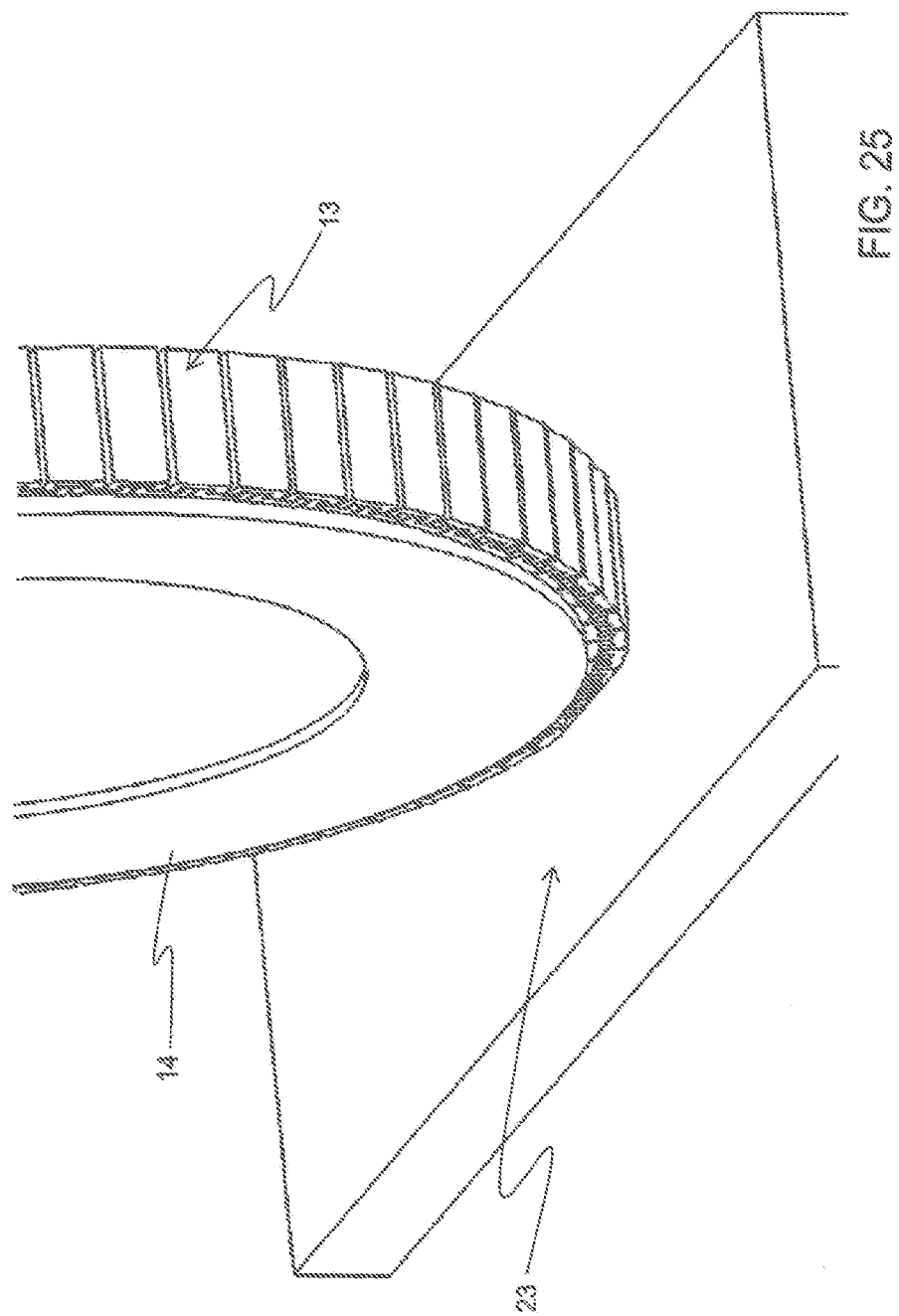
FIG. 25 shows a perspective view of a chain mounted on the perimeter of a tire and rolling over part of the ground, for example, snow and/or mud or over severely damaged pavement.
Figure 26:
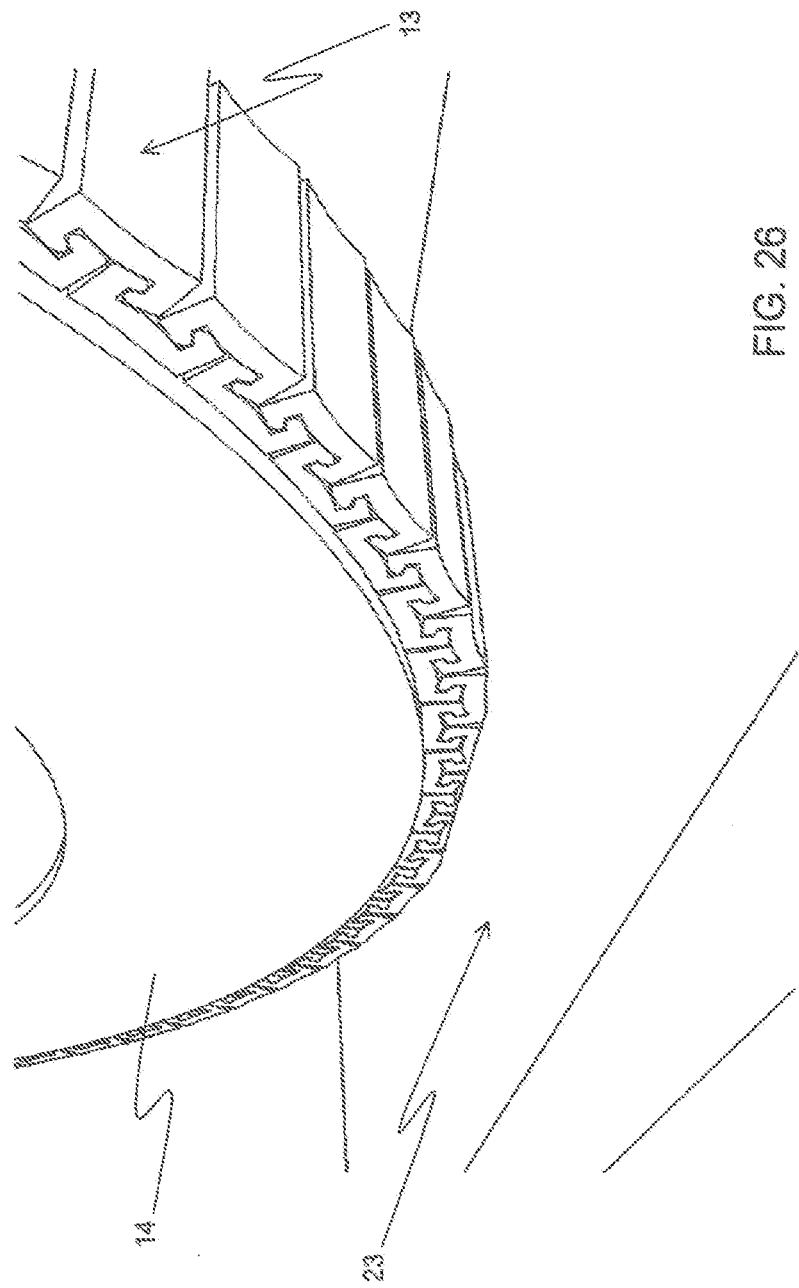
FIG. 26 is an enlarged perspective view of FIG. 22 without showing the fretworks.

FIGS. 25 and 26 show a chain (13) installed on the perimeter of the tread of a wheel (14) rolling on ground (23), for example, on snow or mud, where each end (21, 22) of the links which are positioned at 0° and which acquire the shape of a flattened "U", insert their points in the snow and/or mud improving the adherence of the vehicle to the ground (23).

The rubber (track) chain for vehicles, preferably motor vehicles, has several advantages with respect to prior art chains.

This chain is easy to manufacture, because it comprises a single rubber profile to be cut transversely to the desired contour interval, which generates a series of identical links according to the required length.

The fact of using rubber makes possible to obtain a chain which is very light in weight, with respect to prior art chains, which are usually made of metal links.

This chain can also generate additional damping or shock absorbing in the wheel, due to the elasticity of the material, which reduces the impact of the shock absorbers of the vehicle.

Additionally, the chain of the present invention provides additional protection to the wheel, since any sharp or cutting agent existent in the ground will affect a link and not the tire, which means that this damaged unit element of the chain can be individually replaced by an identical one at any time.

Also, this chain has high adaptability, because it adjusts to different diameters of the treads of tire wheels by adding or removing individual links.

This chain is easy to install, because it can be installed or removed from the wheel without any special tools, using only the physical ability of any person.

This invention presents a wide range of applications because it can be used in any type of land vehicle with wheels, whether motorized or not, human or animal traction, where as an example we can mention: Land moving machinery, trucks, vans, cars, bicycles, tricycles and wagons.

These advantages of the chains made of rubber, can also be obtained with any other resistant elastomer or polymer material which shows an elastic behavior and whose surface once manufactured, presents some kind of roughness.

The invention claimed is:

1. A chain to be used on a vehicle wheel to improve a tire grip in rugged ground, either due to microtopography and/or to the cohesion of aggregates that form a driving surface, additionally protecting a tire against roughness of the rugged ground, said chain being formed by a plurality of links (1), CHARACTERIZED in that each of the plurality of links (1) has a profile with basic shape of a flat "U", having a crossbar (2), a first lateral pillar (3) and a second lateral pillar (4);
wherein the first lateral pillar (3) has a first upper inner portion with a first projection (5) facing towards a central axis of the link (1), as a first extension male plug, creating between the crossbar (2) and said first projection (5) a first gap (7) by way of a female cavity;
wherein the second lateral pillar (4) has a second upper inner portion with a second projection (6) also oriented toward the central axis of the link (1), as a second male extension plug, creating between the crossbar (2) and said second projection (6) a second gap (8) by way of a female cavity, and
wherein each of the plurality of links (1), takes two alternate positions;
in a first alternate position the link takes a position at 0°, whose profile is a flat U-shaped link, and in a second alternate position the link takes a position at 180°, whose profile is an inverted U-shaped link.

2. The chain to be used on the vehicle wheel according to claim 1, CHARACTERIZED in that said links are manufactured from rubber.

3. The chain to be used on the vehicle wheel according to claim 1, CHARACTERIZED in that said links are manufactured from polymers.

4. The chain to be used on the vehicle wheel, according to claim 1, CHARACTERIZED in that said first and second projections (5, 6) are formed by a rectangular cross-section protrusion and said first and second gaps (7, 8) have the shape of a rectangular cavity.

5. The chain to be used on the vehicle wheel according to claim 4, CHARACTERIZED in that said first and second projections (5, 6) each have a convex curved edge.

6. The chain to be used on the vehicle wheel, according to claim 1, CHARACTERIZED in that said first and second projections (5, 6) are formed by a dovetail-shaped protrusion and said first and second gaps (7, 8) have the shape of a cavity homologous to the dovetail shape of the first and second projections (5, 6).

7. The chain to be used on the vehicle wheel, according to claim 1, CHARACTERIZED in that said first and second projections (5, 6) are formed by a trapezoidal cross-section protrusion and said first and second gaps (7, 8) have the shape of a trapezoidal cavity.

8. The chain to be used on the vehicle wheel according to claim 1 CHARACTERIZED in that between an upper face (9) and a lower face (10) of said links there is a plurality of fretworks (25).

9. The chain to be used on the vehicle wheel according to claim 8 CHARACTERIZED in that said fretworks (25) have a rectangular cross section.

10. The chain to be used on the vehicle wheel according to claim 8 CHARACTERIZED in that said fretworks (25) have a circle-shaped cross section.

11. The chain to be used on the vehicle wheel according to claim 8 CHARACTERIZED in that said fretworks (25) have an oblique rectangle-shaped cross-section.

12. A method for assembling the links of the chain to be used on the vehicle wheel according to claim 1, CHARACTERIZED in that the method comprises the following steps:
(a) providing a single elongated profile, made from rubber, polymer or other elastomeric material having a basic flat "U" shape, which has the crossbar (2), the first lateral pillar (3) and the second lateral pillar (4), wherein above the upper inner portion, the first lateral pillar (3) has the first projection (5) facing towards the central axis of said "U", creating between the crossbar (2) and said first projection (5) the first gap (7), wherein above the upper inner portion, the second lateral pillar (4) has the second projection (6) also oriented toward the central axis of said "U" creating between the crossbar (2) and the second projection (6) the second gap (8), and
(b) cutting each link (1) according to a desired width.

13. A method for manufacturing the chain according to claim 12, CHARACTERIZED in that the desired width from said step (b) is a width of the vehicle wheel on which the chain will be used.

14. A method for assembling the links of the chain to be used on the vehicle wheel as described in claim 1, CHARACTERIZED in that said method comprises the following steps:
- (a) placing a link in position at 0°, taking the shape of a flattened "U";
- (b) placing the next link in a position at 180°, taking the shape of an inverted flat "U" next to the link of step (a);
- (c) introducing the first side pillar (3) of said link in a position at 180°, in-between the first and second side pillars (3, 4) of the link positioned at 0°;
- (d) introducing the first projection (5) of the link in position at 180° into the first gap (7) of the link positioned at 0°, leaving both links matched as in a female-male connection;
- (e) placing a new link in a position at 0°, taking the shape of a flat "U" next to the link placed on step (b);
- (f) introducing the second side pillar (4) of the link in a position at 0° of step (e), in-between the first and second side pillars (3, 4) of the link positioned at 180° of step (b);
- (g) introducing the second projection (6) of the link in position at 0° of step (e), into the second gap (8) of the link positioned at 180° of step (b), leaving the last two links, matched as in a female-male connection, and
- (h) repeating steps (a) to (g) several times, by adding links until achieving the desired length to wrap around the total contour of the tread of the wheel (14) of the vehicle.

15. The method for assembling the links of the chain to be used on the vehicle wheel according to claim 14, CHARACTERIZED in that the method further comprises the steps of:
- (i) placing the fitted joined links on the ground in front of the wheel (14) of the vehicle on which the chain will be installed, and
- (j) driving forward the wheel of the vehicle until the wheel is placed on the chain (13), leaving the ends free (15, 16) so that the chain (13) can be wrapped around the wheel (14), and thus the end links (15, 16) can be assembled and linked.

16. A method for assembling the links of the chain to be used on the vehicle wheel according to claim 15, CHARACTERIZED in that the links that are positioned at 180°, take the shape of the inverted U-shaped link which provides a curvature comprising a concave curve that matches a convex curved surface of a tread of the vehicle wheel (14).

17. A method for assembling the links of the chain to be used on the vehicle wheel according to claim 15, CHARACTERIZED in that the links that are positioned at 0°, each take the shape of the flat U-shaped link and provide a curvature which is a concave curve and provide tips oriented towards the rugged ground helping the chain to insert itself into the rugged ground covered with snow and/or mud or gravel.

\* \* \* \* \*